United States Patent [19]
Mehta et al.

[11] Patent Number: 5,879,781
[45] Date of Patent: Mar. 9, 1999

[54] FLOORING LAMINATE HAVING NOISE REDUCTION PROPERTIES

[75] Inventors: Mahendra Mehta, Pittsfield; Timothy R. McLevish, Lenox, both of Mass.

[73] Assignee: The Mead Corporation, Dayton, Ohio

[21] Appl. No.: 915,170

[22] Filed: Aug. 20, 1997

[51] Int. Cl.$^6$ ................................. B32B 3/10; B44F 7/00

[52] U.S. Cl. ..................... 428/137; 428/138; 428/172; 428/542.2; 52/313

[58] Field of Search ..................... 428/137, 138, 428/172, 117, 46, 318.8, 542.2; 181/290; 52/311.1, 313, 390, 717.04

[56] References Cited

U.S. PATENT DOCUMENTS

| | | | |
|---|---|---|---|
| 3,551,270 | 12/1970 | Sharkey | 428/138 |
| 3,567,563 | 3/1971 | Haudenchild et al. | 428/138 |
| 5,238,260 | 8/1993 | Scherübl | 280/610 |

*Primary Examiner*—Donald Loney
*Attorney, Agent, or Firm*—Thompson Hine & Flory LLP

[57] ABSTRACT

A laminate useful as a flooring material having noise dampening properties, the laminate comprising a generally wood substrate having a top surface and a bottom surface a top paper layer bonded to the top surface and a backing layer bonded to the bottom surface. The wood substrate has a plurality of bores therein distributed across a surface thereof, the bores being shaped and sized to effect noise dampening.

16 Claims, 2 Drawing Sheets

FLOORING LAMINATE HAVING NOISE REDUCTION PROPERTIES

The present invention is directed to a laminate useful as a flooring material, and more particularly, to a laminate useful as a flooring material having noise dampening properties.

BACKGROUND OF THE INVENTION

Laminates, including high pressure laminates and composite panel laminates, are often used as flooring materials. However, laminated floors can be noisy when users walk across or transport materials across the flooring surface. Noise levels in laminates are often unsatisfactory as compared to wood or vinyl floors, carpets, or other flooring materials. Accordingly, there exists a need for laminate useful as a flooring material having effective sound dampening qualities.

SUMMARY OF THE INVENTION

The present invention is a laminate flooring material having sound dampening qualities which diminishes the propagation of sound waves when people walk across, or objects are transported across or dropped upon, the flooring. More particularly, the present invention provides for a flooring laminate having a plurality of bores or holes therein which prevent or reduce noise proprogation throughout the floor. The bores reduce the noise levels by disrupting the sound waves, as air contained in the holes acts as a noise dampening medium. In alternate embodiments the bores may be filled with rubber, cork, foam, felt, or other materials having sound dampening properties.

More particularly, the present invention provides a flooring material having noise dampening properties comprising a wood substrate having a top surface and a bottom surface, a laminate bonded to the top surface, and a backing layer bonded to the bottom surface. The wood substrate has a plurality of bores therein distributed across a surface thereof, the bores being shaped, sized and located to effect noise dampening.

These and other objects and advantages of the present invention will be more fully understood and appreciated by reference to the following description, the accompanying drawings and the appended claims.

DETAILED DESCRIPTION OF THE DRAWINGS

Figure 1:
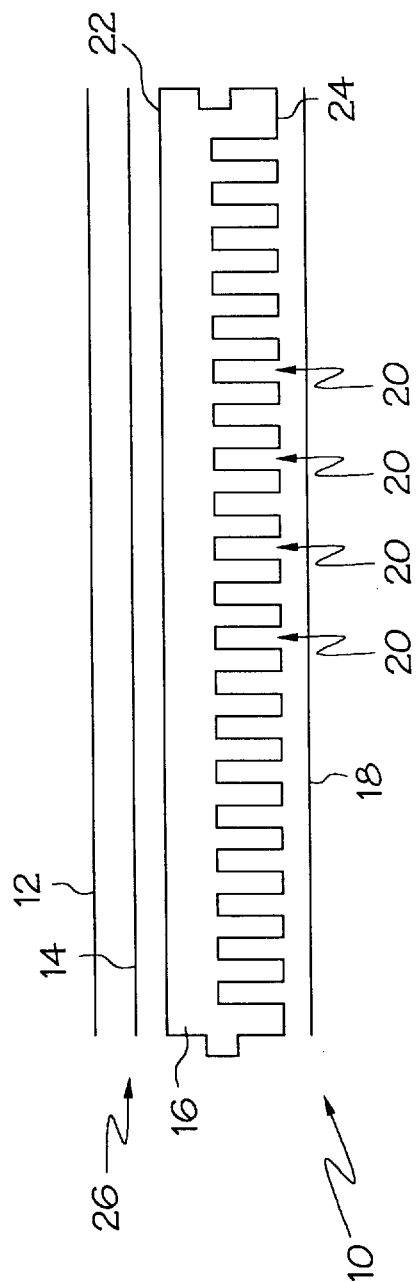
FIG. 1 is an exploded side view in section of a flooring laminate of the present invention.

Flooring laminates are known in the art. These laminates are usually formed by one of two processes. In one process, a decorative laminate is prefabricated and bonded to the top surface of a wooden substrate. In another embodiment, a wooden substrate is assembled with thermoset resin-impregnated laminating papers, such as a decor sheet and an abrasion resistant overlay and a backing paper and integrally formed or consolidated with the laminate under heat and pressure. Examples of these papers and laminates are described in U.S. Pat. Nos. 4,567,087 and 4,880,680 and the references that are cited therein. As shown in FIG. 1, a flooring laminate 10 of the present invention includes substrate 16 having a top surface 22 and a bottom surface 24. A decorative covering 26 is bonded to the top surface 22, and backing layer or laminate 18 is bonded to the bottom surface 24. In one embodiment, the covering 26 includes a layer of decorative paper 14 bonded to the substrate 16, and an abrasion resistant overlay 12 overlying the decorative paper 14. The decor sheets and the abrasion resistant overlays can be manufactured from any of the materials conventionally used in the art for this purpose. The decor sheet is typically a paper which has been preprinted with a wood grain design to simulate the appearance of wood. The overlay is a light weight paper which incorporates an abrasion resistant filler such as alumina. In an alternative embodiment of the invention, the covering 26 may be a pre-fabricated decorative laminate such as a high pressure laminate which includes an abrasion resistant overlay, a decor sheet, and at least one (preferably a plurality) of kraft paper core sheets which have been impregnated with resin and consolidated under heat and pressure (so called high pressure or low pressure laminates can be used). The prefabricated laminate is bonded to the top surface 22 of substrate using an adhesive which does not appear in the drawings. The backing layer 18 which is bonded to bottom surface 24 is paper or laminate, the weight and nature of which are selected to counteract the tendency for covering layer 26 to cause the board to warp. In a further embodiment of the invention, the covering layer 26 does not include an overlay sheet. Instead, the decor sheet or laminate is overcoated with a wear-resistant varnish such as a UV curable coating thereby eliminating the need for the overlay.

The substrate 16 is preferably comprised substantially of wood, such as a chipboard, plywood, or high or medium density fiberboard. Medium density fiberboard (fiberboard having a density of approximately between 40 and 50 pounds per cubic foot) or high density fiberboard (fiberboard having a density of greater than 50 pounds per cubic foot) are preferred materials for the substrate 16.

Decorative paper 14 is preferably a paper which provides an aesthetic or design effect, such as colors or patterns, most typically a wood design. Overlay 12 is placed on top of the decorative paper 14 as a protective layer, which also provides wear resistant, scuff and mar, slip and scratch resistance to laminate flooring. A layer of varnish or a UV curable scratch resistant coating can be used in place of the overlay. The backing 18 is applied to the bottom surface 24 of the substrate 16 to prevent warping, such as crowning or cupping, of the laminate 10. Typically, if the covering 26 consists of a single ply decor sheet, the backing will consist of a paper of comparable weight and properties. Where the covering 26 is a laminate, the backing will be a laminate of a similar construction.

Figure 2:
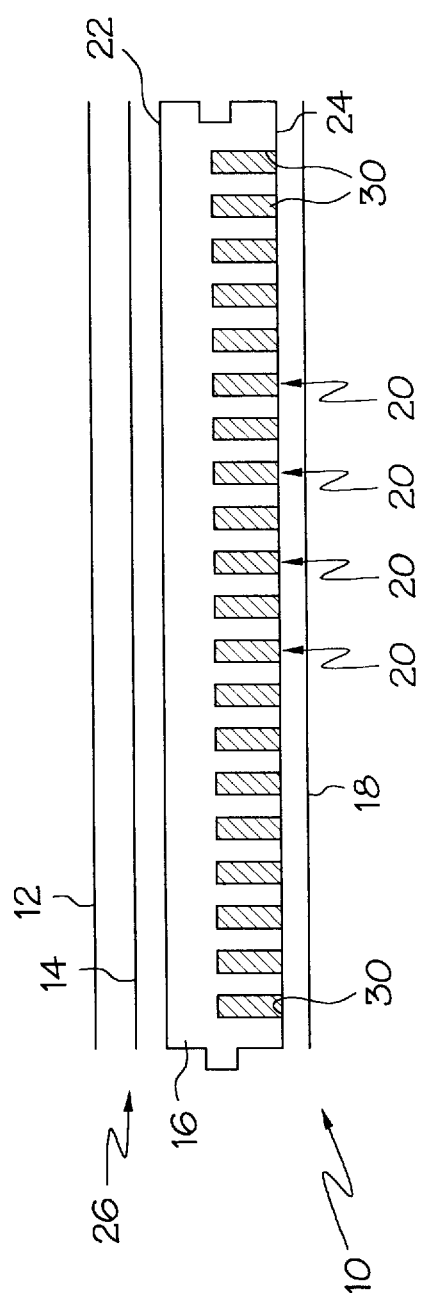
FIG. 2 is a partial view of a laminate in accordance with another embodiment of the invention in which the bores are filled with a sound-deadening material.

The substrate 16 includes a plurality of bores 20 which reduces the propagation of sound waves through the laminate 10. The air in the bores acts as a noise dampening medium to reduce sound wave propagation. As shown in FIG. 2, the bores 20 alternatively may be filled with other materials having sound dampening qualities 30, such as rubber, cork, foam, or felt.

The holes 20 are preferably bored through the bottom surface 24 of the substrate 16, and preferably extend approximately two-thirds of the depth of the substrate 16. The bores are preferably cylindrical in cross-section and preferably having a diameter of approximately 2 mm to 25 mm. However, other shapes of bores, such as square, rectangular, or elliptical may be used without departing from the scope of the invention. The bores may be evenly distributed across the bottom surface 24. However, irregular patterns of bores may also be used without departing from the scope of the present invention. The bores are shown being disposed at an angle perpendicular to the floor, but those skilled in the art will recognize that the bores could also be at a different angle. The bores can be formed by drilling, but they could theoretically be formed by any method including by laser or can be formed during board manufacturing process in wet laid operation.

While the forms of apparatus herein described constitute a preferred embodiment of the invention, it is to be understood that the present invention is not limited to these precise forms and that changes may be made therein without departing from the scope of the invention.

What is claimed is:

1. A laminated flooring board having noise dampening properties comprising:
   a wood substrate having a top surface and a bottom surface, said wood substrate having a plurality of bores therein distributed across a surface thereof for noise dampening;
   a covering including a decorative sheet, an overlay, and at least one core sheet consolidated under heat and pressure to form a decorative laminate, said covering bonded to said top surface of said substrate;
   a backing layer bonded to said bottom surface of said substrate to prevent warping.

2. The laminate of claim 1 wherein said bores are located in said bottom surface of said substrate.

3. The laminate of claim 2 wherein said bores are relatively uniformly distributed across said bottom surface.

4. The laminate of claim 3 wherein said substrate is chip board.

5. The laminate of claim 3 wherein said substrate is plywood.

6. The laminate of claim 3 wherein said substrate is particle board.

7. The laminate of claim 4 wherein said bores are filled with a sound-dampening material to improve the sound dampening properties of said laminate.

8. The laminate of claim 7 wherein said bores extend a depth of approximately 75% of the thickness of said substrate.

9. The laminate of claim 8 wherein said bores are cylindrical.

10. The laminate of claim 9 wherein said bores have a diameter of approximately 2 mm to 20 mm.

11. The laminate of claim 10 wherein said substrate has a thickness of approximately 6 mm to 15 mm.

12. The laminate of claim 1 wherein said overlay of said covering contains an abrasion-resistant filler.

13. A laminated flooring board having noise dampening properties comprising:
   a wood substrate having a top surface and a bottom surface, said wood substrate having a plurality of bores therein distributed across a surface thereof for noise dampening;
   a covering including a decorative sheet overcoated with a varnish, said covering bonded to said top surface of said substrate;
   a backing layer bonded to said bottom surface of said substrate to prevent warping.

14. The laminate of claim 13 wherein said bores are cylindrical and have a diameter of approximately 2 mm to 20 mm.

15. The laminate of claim 13 wherein said substrate has a thickness of approximately 6 mm to 15 mm and wherein said bores extend only partially through said substrate.

16. The laminate of claim 1 wherein said substrate has a thickness of approximately 6 mm to 15 mm and wherein said bores extend only partially through said substrate.

* * * * *